United States Patent [19]
Erhardt et al.

[11] Patent Number: 5,129,185
[45] Date of Patent: Jul. 14, 1992

[54] METHOD FOR THE PRECISION WORKING OF THE TOOTH FLANKS OF PARTICULARLY HARDENED GEARS

[75] Inventors: Manfred Erhardt, Puchheim; Gerhard Reichert, Esting; Herbert Loos, Dorfen-Stadt; Josef Lohrer, Munich, all of Fed. Rep. of Germany

[73] Assignee: HurthMaschinen und Werkzeuge G.m.b.H., Munich, Fed. Rep. of Germany

[21] Appl. No.: 762,958

[22] Filed: Sep. 20, 1991

Related U.S. Application Data

[62] Division of Ser. No. 578,095, Sep. 5, 1990, Pat. No. 5,074,080.

[30] Foreign Application Priority Data

Sep. 11, 1989 [DE] Fed. Rep. of Germany ....... 3930322

[51] Int. Cl.⁵ .............................................. B24B 49/00
[52] U.S. Cl. ................................. 51/165.77; 51/287; 51/DIG. 1
[58] Field of Search ................. 51/165 R, 165.77, 287, 51/105.66, DIG. 1, 956 H, 206 R, 206 P; 409/40, 44, 203, 213, 217, 192, 268

[56] References Cited

U.S. PATENT DOCUMENTS

| | | | |
|---|---|---|---|
| 3,916,569 | 11/1975 | Wydler et al. | 51/287 |
| 4,203,260 | 5/1980 | Fivian | 51/287 |
| 4,467,567 | 8/1984 | Konersmann | 51/287 |
| 4,697,387 | 10/1987 | Wirz | 51/287 |
| 4,993,194 | 2/1991 | Cadish | 51/287 |

*Primary Examiner*—M. Rachuba
*Attorney, Agent, or Firm*—Flynn, Thiel, Boutell & Tanis

[57] ABSTRACT

A method for the precision working of the tooth flanks of particularly hardened gears (workpiece W) with a gearlike tool, the tooth flanks of which tool have an abrasive surface and which rotates in mesh with the workpiece (W). In order to avoid damage to the tool caused by remaining burrs or the like in the tooth system of the workpiece (W), a twin tool with axially spaced similar tools is utilized, individual ones of the similar tools are used one after the other. The first tool removes thereby first the remaining burrs and the like and the second tool performs thereafter the actual precision working.

7 Claims, 3 Drawing Sheets

METHOD FOR THE PRECISION WORKING OF THE TOOTH FLANKS OF PARTICULARLY HARDENED GEARS

This is a division of Ser. No. 70/578,095, filed Sept. 5, 1990, now U.S. Pat. No. 5,074,080.

FIELD OF THE INVENTION

The invention relates to a method for the precision working of the tooth flanks of particularly hardened gears with a gearlike tool and a tool suited for performing the method.

(If here and hereinafter reference is made to "harden" and "hardened", "case-harden" and "case-hardened", what is primarily meant is that which is common in gears.)

BACKGROUND OF THE INVENTION

Methods of the mentioned type are known among others from the German magazine "Werkstatt und Betrieb", 118th year (1985), Number 8, Pages 505-509, in particular Page 506, and from DE-37 34 653 Cl, which corresponds to U.S. application Ser. No. 07/247,875, filed Sept. 22, 1988. In spite of a guided radial infeed of the tool, problems occur again and again in practice due to burrs remaining in the tooth gaps of the workpieces, which burrs cause a partial destruction of the tools coated in most cases with CBN. The mentioned problems occur in particular in workpieces which are hardened after milling; in those workpieces which were also prefinished before hardening, remaining burrs are rarely found, since they are "cut off" or pressed away during finishing. Because precision working is to be performed with an abrasive tool after the hardening, a prefinishing, however, as a rule does not take place for cost-saving reasons, especially since during transport and during handling on the way to and in the hardening shop, damage, mostly in the form of dents or the like and the resulting outward bulging of displaced material adjacent the dent, as shown at B in FIG. 4, in particular on the tooth edges, cannot be avoided 100%.

SUMMARY OF THE INVENTION

A method for the precision working of the tooth flanks of particularly hardened gears (workpiece W) with a gearlike tool, the tooth flanks of which tool have an abrasive surface and which rotates in mesh with the workpiece (W). In order to avoid damage to the tool caused by remaining burrs or the like in the tooth system of the workpiece (W), a twin tool with axially spaced similar tools is utilized, individual ones of the similar tools are used one after the other. The first tool removes thereby first the remaining burrs and the like and the second tool performs thereafter the actual precision working.

An assembled tool for the precision working of the tooth flanks of pre-toothed gears with one elastic and one rigid tool is known from DE-37 07 664 Cl. The tools are here worm-shaped and the gears are first ground with the rigid worm and thereafter polished with the elastic worm. The latter consists of a soft-elastic plastic material into which hard-material granules are embedded. Because of the thus different type of design of the second tool and the different sequence of the application of the two tools, the known design cannot contribute to the solution to the problem to be solved according to the present invention.

BRIEF DESCRIPTION OF THE DRAWINGS

The invention will be described hereinafter in connection with one exemplary embodiment illustrated in three figures, in which.

DETAILED DESCRIPTION

Figure 1:
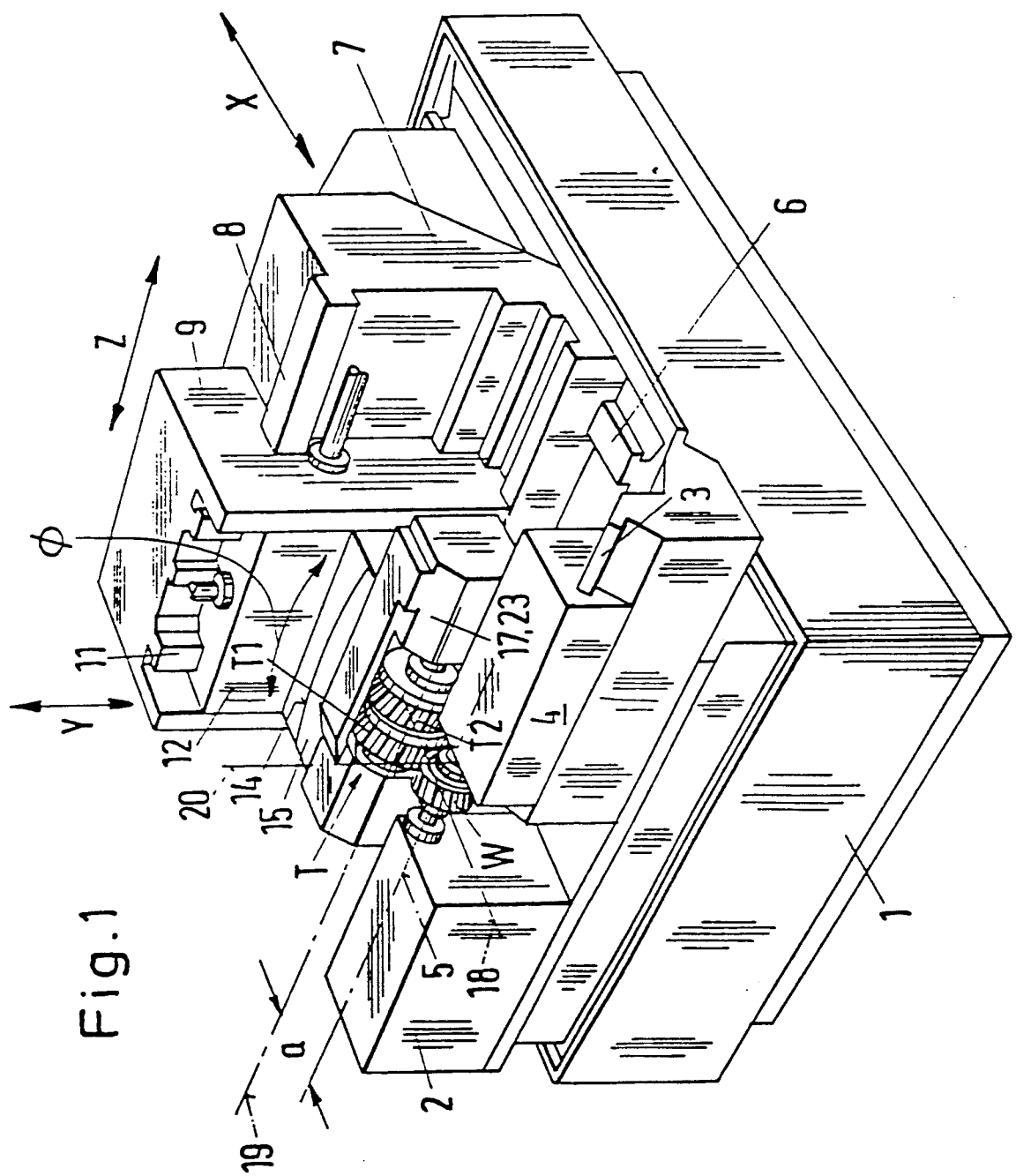
FIG. 1 shows a machine on which the method of the invention can be carried out.

The workpiece W to be machined, here a helically toothed spur gear, is rotatably drivingly received on a machine bed 1 in the gear precision working machine shown in FIG. 1, namely, between a stationary headstock 2 and a tailstock 4 adjustably and fixably arranged in guides 3. Guides 6 are arranged at a right angle to the guides 3 on the machine bed 1. A feed carriage 7 is arranged on the guides 6 and is horizontally movable in arrow direction X. The feed carriage 7 has guides 8 on which an axial carriage 9 is arranged and which is horizontally movable in arrow direction Z parallel with respect to the guides 3 or rather with respect to the workpiece axis 5. Vertical guides 11 exist on the axial carriage 9, on which guides a vertical carriage 12 is arranged for movement up and down in arrow direction Y. A rocker 15 is arranged in an arched guide 14 on the side of the vertical carriage 12 remote from the guides 11 or rather facing the workpiece W. A tool head 17 is rotatably adjustably mounted on a circular guide (not visible) on the rocker 15 and supported for movement about a horizontal adjusting axis 18. A twin tool T composed of two gearlike tools T1, T2 is supported in a shift carriage 23 on the tool head 17. These tools will be discussed later on. The adjusting axis 18 lies at the start of each machining operation preferably, however, not necessarily, in the center rotational plane 16, 26 of the respective tool T1, T2.

The rocker 15 with the tool head 17 and the twin tool T are pivotal in arrow direction $\phi$ about an axis 20 in the arched guide 14 in order to be able to produce crowned tooth flanks on the workpiece teeth. In order to avoid undesired cuts on the teeth of the workpiece W and related damage to the teeth of the tools T1, T2, the center rotational plane 16, 26 of the respective in-use tool T1, T2 is always positioned perpendicularly with respect to the flank line at the respective point of contact. The axis 20 for the pivoting movement $\phi$ extends therefore through the apex of the center rotational plane 16, 26, which apex faces the workpiece W. By rotating the tool head 17 about the adjusting axis 18, a crossed-axes angle $\delta$ between the axis 19 of the tools T1, T2 and the axis 5 of the workpiece W is adjusted (FIG. 1 shows for clarity purposes the workpiece W and the tools T1, T2 with parallel axes, thus $\delta=0°$) The axes 5, 19 lie thereby at a center distance a in parallel planes as long as $\phi=0°$.

The driving elements, such as motors, gearings, etc., for driving the various carriages (feed carriage 7, axial carriage 9, vertical carriage 12, shift carriage 23), for effecting the various movements to pivot the rocker and for adjusting the crossed-axes angle $\delta$ and for the rotational drive of the workpiece W are known and, since they are not part of the subject matter of the invention, are also not illustrated.

Figure 2:
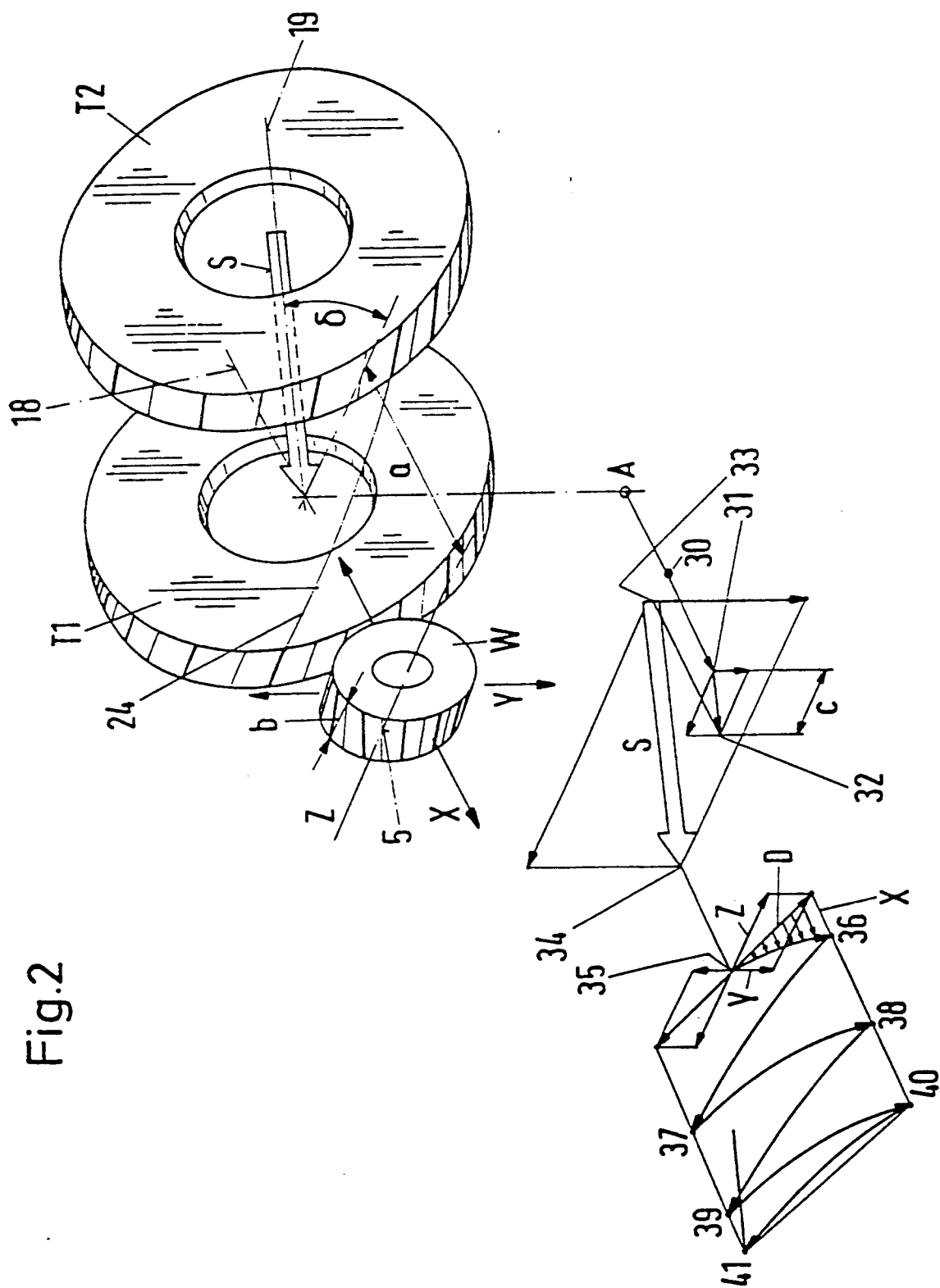
FIG. 2 schematically illustrates the operating sequence of the method.

FIG. 2 shows the two tools T1, T2 and the workpiece W in a simplified manner such that their axes 5, 19 define a crossed-axes angle δ. All other parts, such as the receiving means, clamping devices, tailstock and headstock, carriages etc., are here not illustrated since only the sequence of movement is to be explained using the sequence diagram illustrated therebelow. All paths are thereby shown not to scale. Starting out from an initial position A, first the tool T1 meshes with the workpiece W caused by a radial feed in the X-direction, namely in the direction of a center-distance reduction. In order to accomplish this without a tip-to-tip tooth engagement, the tools T1, T2 and the workpiece W are appropriately correctly positioned and clamped in the machine. A starting point 30 is reached during the feeding movement, at which point exists a two-flank contact between the tool T1 and the workpiece W. The workpiece W started to rotate already earlier when play still existed between the teeth of the tool T1 and the workpiece W. Its teeth start the tool T1 to rotate. The speed is continuously increased until the tool T1 reaches for example 400 rotations per minute. The radial feed continues at the same time until a first working center distance $a_1$ is reached at the point 31. On the path between the points 30 and 31, the abrasive surface of the tool teeth removes all remaining burrs and other irregularities on the workpiece teeth, which burrs and irregularities would interfere during the later precision working with the tool T2. In order for individual displaced material bulgings B or the like projecting from the flanks of the workpiece teeth not to cause a forcing of the tool teeth with the known damaging consequences, the tool T1 can yield resiliently radially until the bulgings or the like have been removed. The tool T1 can due to its resilient arrangement, however, also resiliently follow the radial run-outs and in part also the tumbling errors of the workpiece tooth system so that the flank contact and pressure between tool T1 and workpiece W is substantially maintained. Only in this manner are all workpiece tooth flanks contacted without first, for example, correcting or eliminating the rotation error.

When the tool T1 has reached the point 31, the feed movement is terminated and a short feed movement in direction of the tool axis (arrow direction S) is carried out over a path c to a point 32. With this movement, possibly existing machining tracks, for example grooves, are "wiped out". The path c can be chosen freely, approximately in dependency of the width b of the workpiece teeth, however, it can also be always the same, for example 2 mm long. The workpiece teeth are now in a condition which will enable a satisfactory precision working.

The tool T1 is for this purpose pulled back to a point 33, while maintaining the present speed $n_1$, at which point 33 the teeth of workpiece W and tool T1 are still in mesh, however, with play. The tool T1 is now again shifted in direction of its axis 19 and with the tool T2, which so far had taken part also in all movements of the tool T1, however, without being in engagement with the workpiece W. During the new shift movement in arrow direction S, the tool T2 meshes with the workpiece W in such a manner that its teeth already mesh when the teeth of the tool T1 are still in mesh over a portion of their width with the workpiece W. The tools T1, T2 are arranged in such a manner with respect to one another that the teeth of the tool T2 form a continuation of the teeth of the tool T1, which is indicated by the line 24. This alignment of the teeth enables also the shifting, namely, the changing of the tools T1, T2 during the rotation. The tool T1 acts thereby and through its function as an auxiliary tool for the remaining burr removal also as a protector for the (main) tool T2, namely a) during the initial threading of the tooth system of the tool T2 with the workpiece tooth system under the guidance of the tool T1, and b) by avoiding an acceleration load from standstill (speed n=0) to working speed, which acceleration load damages any CBN-coating possibly existing on the tool T2.

The shift movement terminates at a point 34, at which only the tool T2 meshes—first still with play with the workpiece W. The tool T2 is then, starting out from the point 34, fed in X-direction, thus again in the direction of a center-distance reduction, namely, with a simultaneous increase of the speed until at a point 35, a two-flank contact is again created and the tool T2 has a speed $n_2$ of for example 2000 rotations per minute.

Diagonal movements D are superposed over the infeed movement in the X-direction for the now starting actual precision working, which diagonal movements D result from the movements of the vertical carriage 12 in the Y-direction and of the axial carriage 9 in the Z-direction. In place of the diagonal movements D, it is also possible to carry out parallel movements only in the Z-direction, thus parallel with respect to the workpiece axis. Thus, the tool T2 moves back and forth on the workpiece W constantly removing chips, with a reversal of the diagonal and thus the tool movement occurring at only exemplary given points 36, 37, 38, 39. The desired center distance $a_2$ between the tool T2 and the workpiece W is reached at a point 40 and one or more back and forth movements without any infeed movement can still take place before the tool T2 and with it the tool T1 is moved from a point 41 into the initial position A and the rotary movement is turned off. The path covered by the tool T2 between the points 35 and 41 is to only serve as an example in the illustrated and described form. Many variations are here possible.

Figure 3:
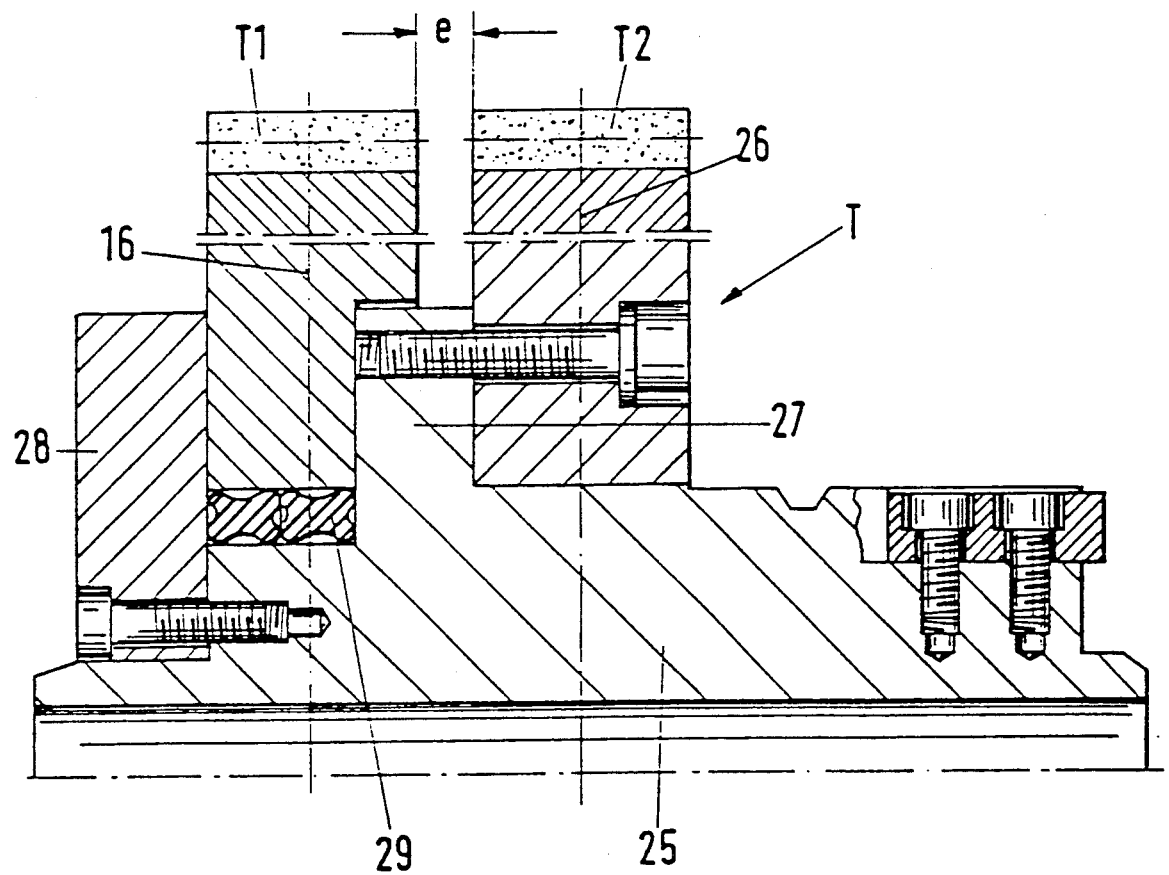
FIG. 3 is a cross-sectional view of the tool of the invention.
Figure 4:
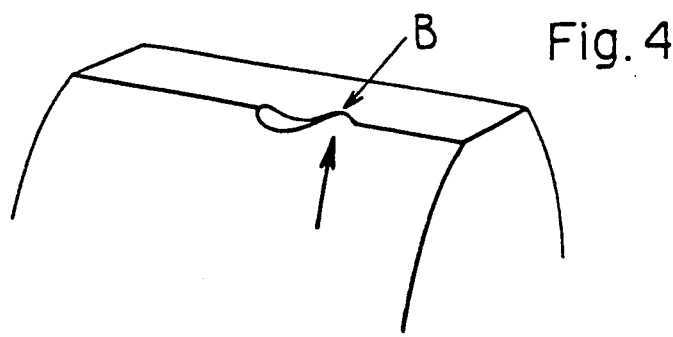
FIG. 4 is a perspective view of a damaged workpiece.

The twin tool T is shown in FIG. 3 along with its important parts. The tool T2 is centered and rigidly fixed as by screws to a hub 25, which hub can be received and chucked by means (not illustrated) in the tool head 17 or rather shift carriage 23. The tool T1 is axially held between a flange 27 and a retaining disk 28. In contrast to the tool T2, it is not directly centered on the hub 25, but through elastic rings 29. It has namely been found that the removal of the remaining burrs and the like is sensible only with a variable center distance between the two tooth systems. Otherwise a quick destruction of the tool teeth occurs or rather because of a concentricity error and tumbling of the workpiece tooth system, only a partial contact within segments of the workpiece W takes place. The tool axis or rather the hub cannot be elastically supported. Commercially available sealing rings can be used as elastic rings 29, which sealing rings enable with a suitable radial load a radial yielding of the tool T1 by several 1/10 mm. Since the tool T1 may not be clamped between the flange 27 and the retaining disk 28, it can—however, to a very small degree—also assume an inclined position or can tumble. The tool T1 has the same tooth system dimensions as the tool T2 and the two tooth systems are also aligned as this is indicated with the line 24 in FIG. 2. A distance e exists between the two tools T1, T2, which distance is dimensioned such that the respectively not in-use tool does not come into contact with the workpiece W, even during the largest possible crossed-axes angle δ, when a shifting movement occurs over the path S and during the back and forth movements between the points 35 and 41.

The coating of the tooth flanks can differ corresponding with the different tasks of the two tools T1, T2. For the tool T1, it can for example be a thin sprayed-on layer of Wolfram carbide, however, a coating with CBN granules is also possible, as is the case for the tool T2, however, in this case with a subsequent grinding of the tooth flanks, which is not necessary in the case of the tool T1.

The embodiments of the invention in which an exclusive property or privilege is claimed are defined as follows:

1. A method for the precision working of the tooth flanks of particularly hardened gears (workpiece W) with a gearlike tool, the flanks of which tool have an abrasive surface, namely, a surface which does not have uniformly directed cutting edges, with the tool rotating with the workpiece in a reciprocal mesh, comprising the steps of:

selecting a twin tool having two axially spaced tools with the same dimensions at least with respect to their number of teeth, the module and the pitch angle, which tools are used one after the other without necessitating the workpiece to be rechucked, such that:
   a) with the first tool in a two-flank contact with the workpiece remaining burrs and other irregularities are removed from the tooth flanks of the workpiece, and thereafter
   b) with the second tool also in a two-flank contact with the workpiece the actual precision working of the tooth flanks of the workpiece is done.

2. The method according to claim 1, wherein:
   a) starting out from an initial position of the twin tool, the first tool is brought into mesh with the workpiece and starts to rotate and accelerate during a continuous radial feed until, during a first speed and with a two-flank contact, a first working center distance is reached;
   b) the twin tool carries out a feed movement, while maintaining the two-flank contact and the first speed, over a short path in direction of its axis, with the path being substantially shorter than the width of the workpiece tooth system;
   c) the two-flank contact is cancelled by a radial pulling back of the twin tool;
   d) the twin tool is shifted in direction of its axis until the first tool is out of mesh and the second tool is in a loose mesh with the workpiece, with both tools being during the shifting temporarily in a loose mesh over a portion of their width with the workpiece;
   e) the speed is further increased with a continuous, radial feed of the second tool until at a second speed a two-flank contact is again created;
   f) the radial feed is continued with the super-positioning of back and forth feed movements until a second working center distance corresponding with a desired center distance is achieved;
   g) the twin tool is pulled back into its initial position and the rotation is stopped.

3. The method according to claim 2, wherein the second speed is substantially higher than the first speed.

4. The method according to claim 2, wherein the length of the feed path depends on the width of the workpiece.

5. The method according to claim 4, wherein the length of the feed path is 1 mm to 5 mm.

6. The method according to claim 2, wherein the feed path has a constant length independent of the width of the workpiece.

7. The method according to claim 6, wherein the constant length of the feed path is approximately 2 mm.

* * * * *